US011195325B2

(12) United States Patent
Boichentsov et al.

(10) Patent No.: US 11,195,325 B2
(45) Date of Patent: Dec. 7, 2021

(54) METHOD AND APPARATUS FOR FREEFORM CUTTING OF DIGITAL THREE DIMENSIONAL STRUCTURES

(71) Applicant: 3D4Medical Limited, Blackrock (IE)

(72) Inventors: Volodymyr Boichentsov, Blackrock (IE); Iuliia Boichentsova, Blackrock (IE)

(73) Assignee: 3D4Medical Limited, Blackrock (IE)

( * ) Notice: Subject to any disclaimer, the term of this patent is extended or adjusted under 35 U.S.C. 154(b) by 885 days.

(21) Appl. No.: 15/193,861

(22) Filed: Jun. 27, 2016

(65) Prior Publication Data

US 2017/0004659 A1    Jan. 5, 2017

Related U.S. Application Data

(60) Provisional application No. 62/187,302, filed on Jul. 1, 2015.

(51) Int. Cl.
*G06F 3/0481* (2013.01)
*G06F 3/0484* (2013.01)
(Continued)

(52) U.S. Cl.
CPC .......... *G06T 15/60* (2013.01); *G06F 3/04815* (2013.01); *G06F 3/04845* (2013.01);
(Continued)

(58) Field of Classification Search
None
See application file for complete search history.

(56) References Cited

U.S. PATENT DOCUMENTS 5,929,860 A   7/1999  Hoppe
6,879,324 B1  4/2005  Hoppe
(Continued)

FOREIGN PATENT DOCUMENTS

WO    2009096891 A1    8/2009

OTHER PUBLICATIONS

Boothroyd (NPL "Using Mesh Cutting in an Interactive Podiatric Orthopaedic Surgery Simulator") Citation: Boothroyd, Andrew. Using Mesh Cutting in an Interactive Podiatric Orthopaedic Surgery Simulator. Diss. University of Huddersfield, 2011.*
(Continued)

*Primary Examiner* — Diane M Wills
(74) *Attorney, Agent, or Firm* — Dickinson Wright PLLC; Andrew D. Dorisio (57) ABSTRACT

A method of editing a digital three-dimensional structure associated with one or more two-dimensional texture in real time is disclosed, wherein the structure and one or more texture are processed and output same in a user interface, and user input is read in the user interface and processed into a cut shape of the three-dimensional structure. A simplified structure is generated based on the three-dimensional structure, and points of the cut shape are associated with the simplified structure to generate a curve. Points of the curve corresponding to edges of the curve on the simplified structure are determined, and geometrical characteristics and texture coordinates of the new points calculated. A new three dimensional structure is generated along the curve and layers of the structure are joined, for the cut and layered structure to be rendered in the user interface. An apparatus embodying the method is also disclosed.

15 Claims, 8 Drawing Sheets

(51) Int. Cl.
*G06T 11/00* (2006.01)
*G06T 17/20* (2006.01)
*G06T 19/20* (2011.01)
*G06T 15/60* (2006.01)
*G06T 15/04* (2011.01)

(52) U.S. Cl.
CPC ............ *G06T 11/001* (2013.01); *G06T 15/04* (2013.01); *G06T 17/20* (2013.01); *G06T 19/20* (2013.01); *G06T 2210/21* (2013.01); *G06T 2210/41* (2013.01); *G06T 2215/06* (2013.01); *G06T 2219/008* (2013.01); *G06T 2219/2021* (2013.01)

(56) References Cited

U.S. PATENT DOCUMENTS

| | | |
|---|---|---|
| 7,009,611 B2 | 3/2006 | Di Lelle |
| 7,072,510 B2 | 7/2006 | Pettigrew |
| 7,142,709 B2 | 11/2006 | Girard |
| 7,155,719 B2 | 12/2006 | Danan |
| 7,167,189 B2 | 1/2007 | Di Lelle et al. |
| 8,334,857 B1 | 12/2012 | Ogrinc et al. |
| 8,471,825 B2 | 6/2013 | Miyazaki |
| 8,686,880 B2 | 4/2014 | Salter et al. |
| 2003/0091227 A1 | 5/2003 | Chang et al. |
| 2003/0112239 A1 | 6/2003 | Shin et al. |
| 2006/0284880 A1 | 12/2006 | Zhou et al. |
| 2007/0024616 A1 | 2/2007 | Goyne et al. |
| 2007/0080960 A1 | 4/2007 | Dayanand et al. |
| 2013/0135312 A1* | 5/2013 | Yang ............ G06T 3/0006 345/427 |

OTHER PUBLICATIONS

Zimmerman et al. (NPL "MeshSketch: Automated, Sketch-Based Editing of Triangular Meshes") Citation: Zimmermann, Johannes, Gutachter Prof Dr. Marc Alexa, and Heinz U. Lemke. "MeshSketch: Automated, Sketch-Based Editing of Triangular Meshes." Technishce Universität Berlin, Berlin, Germany (Jun. 28, 2007).*
Interactive 3D Haptic Carving using Combined Voxels and Mesh—Jeff Williams et al. Haptic Audiovisual Environments and Games, 2008. HAVE 2008 IEEE International Workshop On, IEEE Piscataway, NJ, USA Oct. 18, 2008 (Oct. 18, 2008) pp. 108-113, XP 031365060, ISBN 978-1-4244-2668-3.
Ralph Brecheisen et al. "Flexible GPU-based multi-volume raycasting" vision, modelling and visualisation 2008 (VMV 2008), 2008, pp. 1-10, XP 002763366; retrieved from the Internet: URL: HTTP://citeseerx.ist.psu.edu/viewdoc/downloaddoi=10.1.1.518. 6927 rep=rep1 type=pdf [retrieved by EPO on Oct. 25, 2016].
Rossler F et al/: "Dynamic shader generation for GPU-based multi-volume ray casting", IEEE Computer Graphics and Applications, IEEE Service Centre, New York, NY, US, vol. 28, No. five, Sep. 1, 2008 (Sep. 1, 2008), pp. 66-77, XP 011248041, ISSN: 0272-1716.
Wikipedia: "Ramer—Douglas—Peucker Algorithm", Jun. 9, 2015 (Jun. 9, 2015), XP 002763367, retrieved from the Internet: URL: https://en.Wikipedia.org/W/index. PHP Title=Ramer%E2%80% 93Douglas%E2%80%93PEUCKER_algorithm OLDID= 666146484 retrieved by EPO on Oct. 25, 2016.

* cited by examiner

METHOD AND APPARATUS FOR FREEFORM CUTTING OF DIGITAL THREE DIMENSIONAL STRUCTURES

FIELD OF THE INVENTION

The present invention relates to a method and apparatus for the freeform cutting of digital three dimensional structures. More particularly, the present invention relates to a method and apparatus for generating and controlling a tool adapted to cut freeform shapes in three dimensional structures processed by a software program.

BACKGROUND OF THE INVENTION

In the field of three dimensional (3D) computer graphics, 3D software applications are used for the creation of 3D structures and typically include a modeller tool for creating polygon meshes consisting of vertices with respective X, Y and Z coordinates collectively defining a structure in 3D model space, and a UV mapping tool for associating U and V cardinal coordinates of a two dimensional (2D) image defining the appearance of the structure for rendering purposes with the X, Y and Z coordinates of vertices composing the mesh, into a UV map with which to paint the mesh in 3D model space.

Many data processing techniques are known for viewing relationships between the multiple layers of a 3D structure, which is typically composed of several polygon meshes and respective UV texture maps also known as UV map layers.

An example of such a 3D structure is a computer rendering of the human body, with a first mesh defining the human skeleton having a respective UV map layer with the appearance of bone material, a second mesh defining the human muscle architecture having a respective UV map layer with the appearance of dark and deeply ribbed flesh, and a third mesh defining the human epidermis having a respective UV map layer with the appearance of skin, wherein the relationships nest the first, second and third structures and respective UV map layers within one another in a manner analogous with the real human body.

Such techniques of the prior art ordinarily rely on either a tool which allows users to remove an entire polygon mesh and UV map layer, for instance removing the entire third mesh and skin tone UV map layer to view the underlying muscle mesh and flesh UV map layer, or tools that remove a predefined section of a layer, for instance removing the 'right arm' section of the third mesh and skin tone UV map layer to view the corresponding 'right arm' section of underlying muscle mesh and flesh UV map layer.

These techniques exhibit distinct disadvantages. In the simplest example of removing an upper, or outer layer, it is not possible to visually compare the removed layer with the remaining, underlying layers. In cases wherein a predefined section of a layer can be partially removed, no flexibility exists due to the predefining characteristics, whereby direct relationships between overlying and underlying cannot be visualized.

More recent techniques of the prior art provide tools which approximate freeform cuts to 3D objects, which nevertheless still exhibit distinct disadvantages.

In cases wherein a prior art cutting tool is used on an editable polygonal object, the shape of the cut must be created with the tool on the surface of the base structure and object polygons located inside the created shape must then be deleted, with the repetition of a corresponding cut on the opposite side of the object. A separate bridge tool must then be used to select and connect both cuts together. The new polygons in the cut, which replace the deleted polygons of the original 3D object, must then be manually UV mapped.

In other cases wherein a cutting tool is used on a boolean object, the shape of the cut needs to be created as a separate object, and a boolean modifier tool must then be used on the source Boolean object, with piecing of the specific for subtraction. In still other cases wherein a slice tool is used on an editable polygonal object, polygons on one side of the base object must be deleted and all open edges must be selected and capped or filled with new polygons with a separate tool. Again the new polygons in the cut, which replace the deleted polygons of the original 3D object, must then be manually UV mapped.

All of these distinct techniques are considered disadvantageous because they require lengthy and manual ad hoc intervention, frequently by a skilled three-dimensional artist or modeller. The present invention aims to overcome or alleviate some or all of the above disadvantages, desirously in real time.

SUMMARY OF THE INVENTION

The present invention relates to a method and apparatus for generating and controlling a tool to cut freeform shapes through polygon mesh and textures on a 3D model within a software program. More particularly, the invention relates, in preferred embodiments, to a tool that allows users to create freeform cuts to achieve views of underlying structures, regardless of user skill.

According to a first aspect of the present invention, there is therefore provided an apparatus for editing a digital three-dimensional structure associated with one or more two-dimensional texture in real time, comprising data storage means adapted to store the digital three-dimensional structure and the one or more two-dimensional texture, data processing means and display means for displaying a user interface, wherein the data processing means is adapted to process the stored digital three-dimensional structure and the one or more two-dimensional texture and output same in a user interface, read user input in the user interface and process user input data into a cut shape of the three-dimensional structure, generate a simplified structure based on the three-dimensional structure, associate points of the cut shape with the simplified structure to generate a curve, determine new points of the curve corresponding to edges of the curve on the simplified structure, calculate geometrical characteristics and texture coordinates of the new points, and generate a new three dimensional structure along the curve and join layers of the structure.

In an embodiment of the apparatus, the data processing means may be further adapted to alter a rendering perspective of the stored and processed digital three-dimensional structure and the one or more two-dimensional texture in the user interface via one or more rotations, translations, scaling.

In an embodiment of the apparatus, the data processing means may be further adapted to generate the simplified structure as a temporary three-dimensional structure. In a variant of this embodiment, the temporary structure advantageously comprises a HalfEdge mesh associated with a C-Mesh.

In an embodiment of the apparatus, the data processing means may be further adapted to associate points by painting the cut shape on the three-dimensional structure as a plurality of points converted to three-dimensional space and read from an off-screen depth buffer, defining a curve. In a variant of this embodiment, the data processing means may be further adapted process the plurality of points with a Laplacian smoothing algorithm and a Ramer-Douglas-Peucker algorithm.

The data processing means may be further adapted to determine new points by projecting approximate intersection points of the painted curve in two dimensions then mirroring back to find intersections on triangles.

The data processing means may be further adapted to calculate by identifying a number of intersection points on triangle faces to determine a number and an order of layers associated with the simplified structure.

The data processing means may be further adapted to calculate by determining points of each triangle intersecting another triangle to identify divided triangles having two splitable edges.

The data processing means may be further adapted to split triangle edges by building a plane from adjacent intersection points of two triangles and determining an intersection point for the plane and edge.

The data processing means may be further adapted to joining layers further comprises joining all points of two neighbouring layers via triangulation.

In an embodiment of the apparatus, the stored digital three-dimensional structure and the one or more two-dimensional texture preferably comprises learning plates in a medical reference.

According to a further aspect of the present invention, there is also provided a method of editing a digital three-dimensional structure associated with one or more two-dimensional texture in real time, comprising the steps of processing the stored digital three-dimensional structure and the one or more two-dimensional texture and outputting same in a user interface, reading user input in the user interface and process user input data into a cut shape of the three-dimensional structure, generating a simplified structure based on the three-dimensional structure, associating points of the cut shape with the simplified structure to generate a curve, determining new points of the curve corresponding to edges of the curve on the simplified structure, calculate geometrical characteristics and texture coordinates of the new points, generating a new three dimensional structure along the curve and joining layers of the structure, and updating the user interface.

Embodiments of the above method may include data processing steps functionally equivalent to respective embodiments of the apparatus described hereinabove.

According to yet another aspect of the present invention, there is also provided a computer program product recorded on a data carrying medium which, when processed by a data processing terminal, configures the terminal to process a digital three-dimensional structure and one or more two-dimensional texture and output same in a user interface, read user input in the user interface and process user input data into a cut shape of the three-dimensional structure, generate a simplified structure based on the three-dimensional structure, associate points of the cut shape with the simplified structure to generate a curve, determine new points of the curve corresponding to edges of the curve on the simplified structure, calculate geometrical characteristics and texture coordinates of the new points, generate a new three dimensional structure along the curve and join layers of the structure, and update the user interface.

Embodiments of the above computer program product may configure the terminal to perform data processing steps functionally equivalent to respective embodiments of the apparatus described hereinabove.

Other aspects are as set out in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE EMBODIMENTS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

The words "comprises/comprising" and the words "having/including" when used herein with reference to the present invention are used to specify the presence of stated features, integers, steps or components but does not preclude the presence or addition of one or more other features, integers, steps, components or groups thereof.

Figure 1:
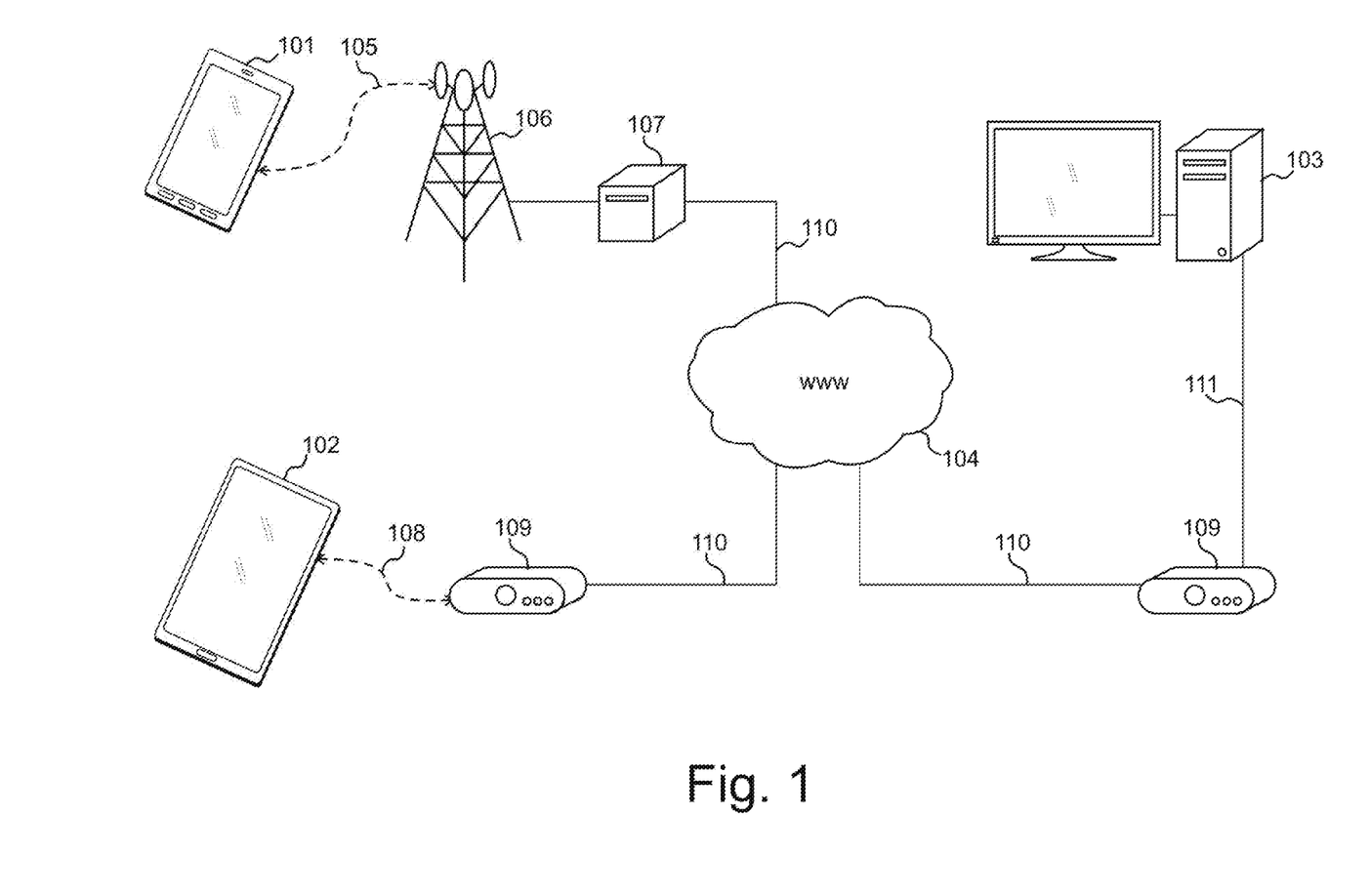
FIG. 1 shows a computing environment including a plurality of data processing terminals communicating data, including 3D structures, UV map layers and a set of instructions according to an embodiment of the present invention.

Referring now to the figures and initially FIG. 1, there is shown a network environment in which several data processing terminals 101, 102, 103 are connected to one another over a Wide Area Network (WAN) 104, in the example the Internet.

Data processing terminal 101 is a mobile communication device which receives or emits data, including voice and/or text data, encoded as a digital signal over a wireless data transmission 105, wherein said signal is relayed respectively to or from the device 101 by the geographically-closest communication link relay 106 of a plurality thereof. The plurality of communication link relays $106_N$ allows digital signals to be routed between mobile devices 101 and their intended recipient by means of a remote gateway 107. Gateway 107 is for instance a communication network switch, which couples 110 digital signal traffic between wireless telecommunication networks, such as the network within which wireless data transmissions 105 take place, and the WAN 104. The gateway 107 further provides protocol conversion if required, for instance if the device 101 uses a Wireless Application Protocol ('WAP') or Secure Hypertext Transfer Protocol ('HTTPS') to communicate data.

Data processing terminal 102 is a mobile tablet—format device which receives or emits data encoded as a digital signal over a wireless data transmission 108, wherein said signal is related respectively to or from the computer 102 by a local wireless router 109 operating according to the 802.11 wireless transmission protocol ('WiFi'). The router 109 is itself connected to the WAN 104 via a conventional ADSL or optical fibre connection over a wired telecommunication network 110.

Data processing terminal 103 is a personal computer configured as a data server connected to the WAN 105 substantially as described in connection with device 102, however wherein a wired connection 111 to its respective router 109 is preferred to maximise data communication bandwidth.

In the environment of FIG. 1 therefore, the user of each terminal 101, 102 has the use of a mobile communicating device configured to receive and communicate data encoded as a digital signal over a wireless data transmission, respectively from and to the server 103.

Figure 2:
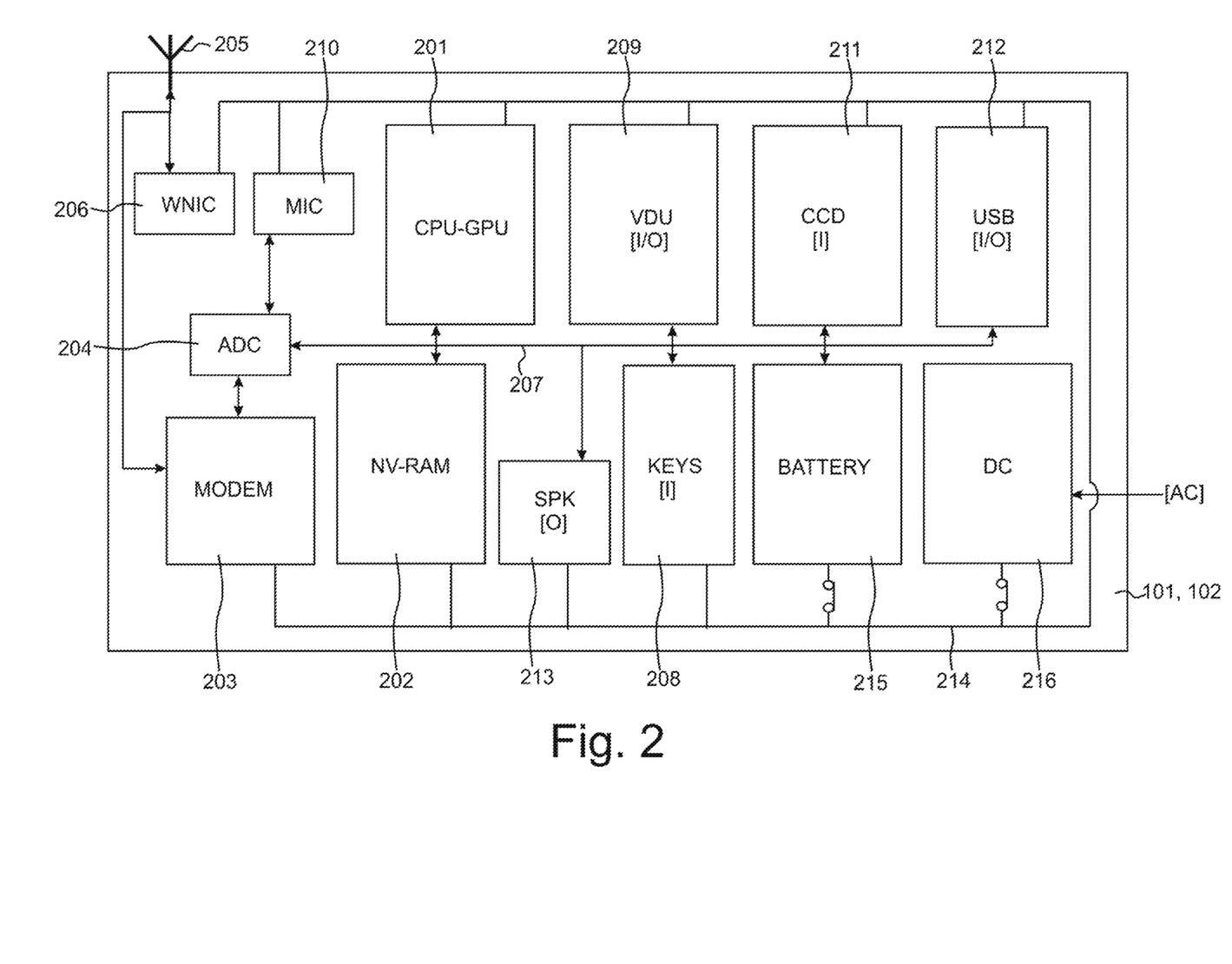
FIG. 2 illustrates a typical hardware structure of a terminal shown in FIG. 1.

A typical hardware architecture of either of the networking devices 101, 102 is shown in FIG. 2 in further detail, by way of non-limitative example. The mobile phone 101 and the tablet device 102 each include a data processing unit 201, for instance a general-purpose microprocessor, acting as the main controller of the data processing terminal and which is coupled with memory means 202, comprising volatile random-access memory (RAM), non-volatile random-access memory (NVRAM) or a combination thereof.

Each device further includes networking means. Communication functionality in mobile phone 101 is provided by a modem 203, which provides the interface to external communication systems, such as the GPRS, 3G or 4G cellular telephone network 106, 107 shown in FIG. 1, associated with or containing an analogue-to-digital converter 204, which receives an analogue waveform signal through an aerial 205 from the communication link relay 106 and processes same into digital data with the data processing unit 201 or a dedicated signal processing unit. Communication functionality in tablet device 102 is provided by a wireless network interface card (WNIC) 206 interfacing the tablet device 102 with the wireless local area network generated by router 109, and/or likewise by a 3G or 4G modem 203 as described above.

The CPU 201, NVRAM 202 and networking means 203 to 206 are connected by a data input/output bus 207, over which they communicate and to which further components of each device 101, 102 are similarly connected in order to provide wireless communication functionality and receive user interrupts, inputs and configuration data.

Accordingly, user input may be received from a data input interface 208, which for mobile phone 101 is a keypad with a limited number of multi-functional keys and/or a capacitive or resistive touch screen feature of the display unit 209 and, for tablet device 102, is a capacitive or resistive touch screen feature of the display unit 209.

Further input data may be received as analogue sound wave data by a microphone 210, digital image data by a digital camera lens 211 and digital data via a Universal Serial Bus (USB) 212. Processed data is output as one or both of display data output to the display unit 209 and audio data output to a speaker unit 213.

Power is supplied to the above components by the electrical circuit 214 of devices 101, 102, which is interfaced with an internal battery module 215, which itself may be recharged on an ad hoc basis by an electrical converter 216.

Figure 3:
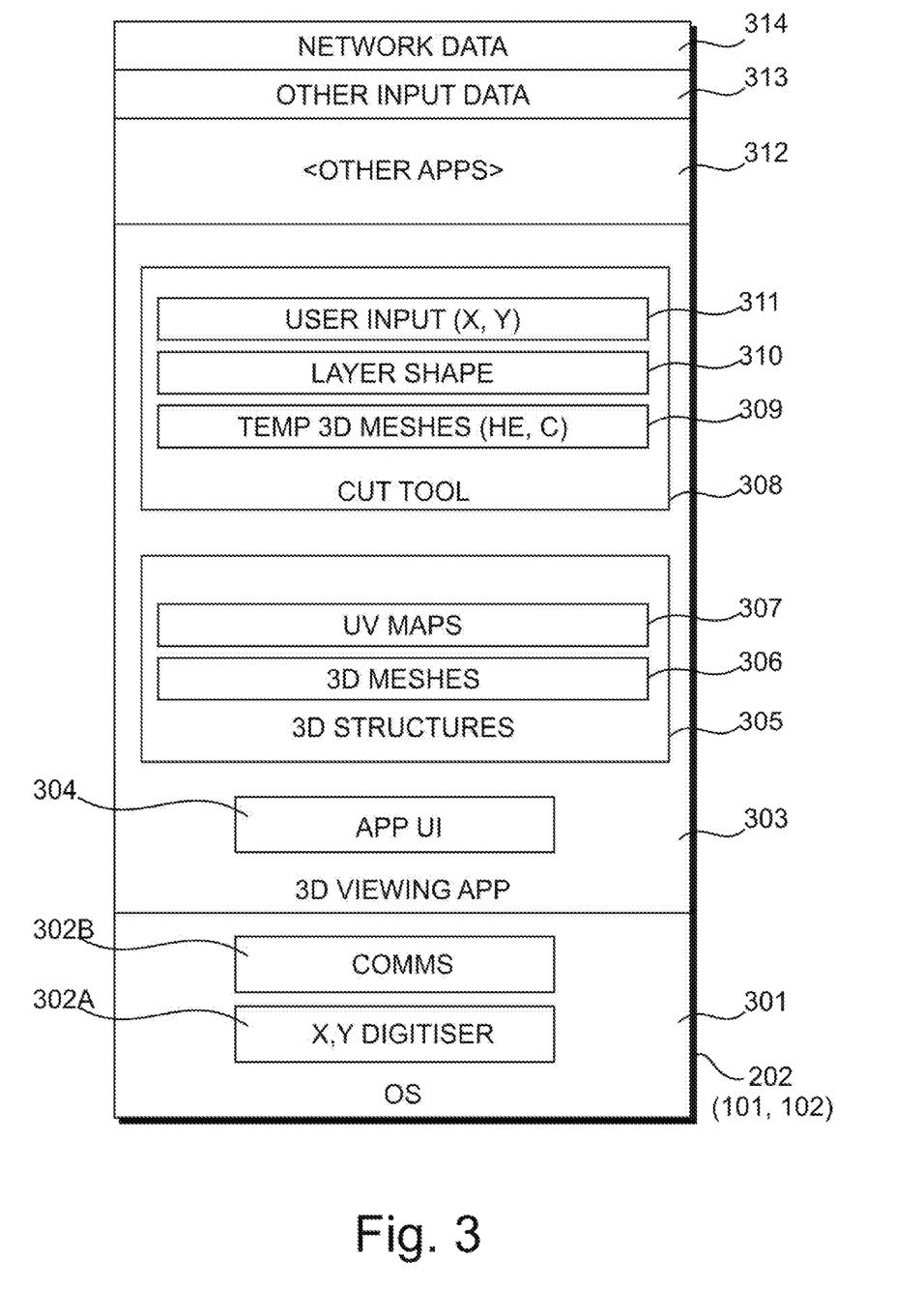
FIG. 3 illustrates the memory contents of a terminal of FIGS. 1 and 2, including the 3D structures, UV map layers and set of instructions at runtime.

FIG. 3 is a logical diagram of the contents of the memory means 202 of either data processing terminal 101, 102 at runtime, when configured to cut freeform shapes in UV mapped 3D structures in real time according to the present invention.

An operating system is shown at 301 which, if the device 101 is for instance an iPhone® mobile phone handset manufactured by Apple® Inc. of Sunnyvale, Calif., or if the device 102 is for instance an iPad® tablet computer likewise manufactured by Apple® Inc., is iOSID likewise distributed by Apple® Inc. The OS 301 includes communication subroutines 302 to configure the data processing terminal for bilateral network communication via the modem 203 and NIC 206.

Figure 4:
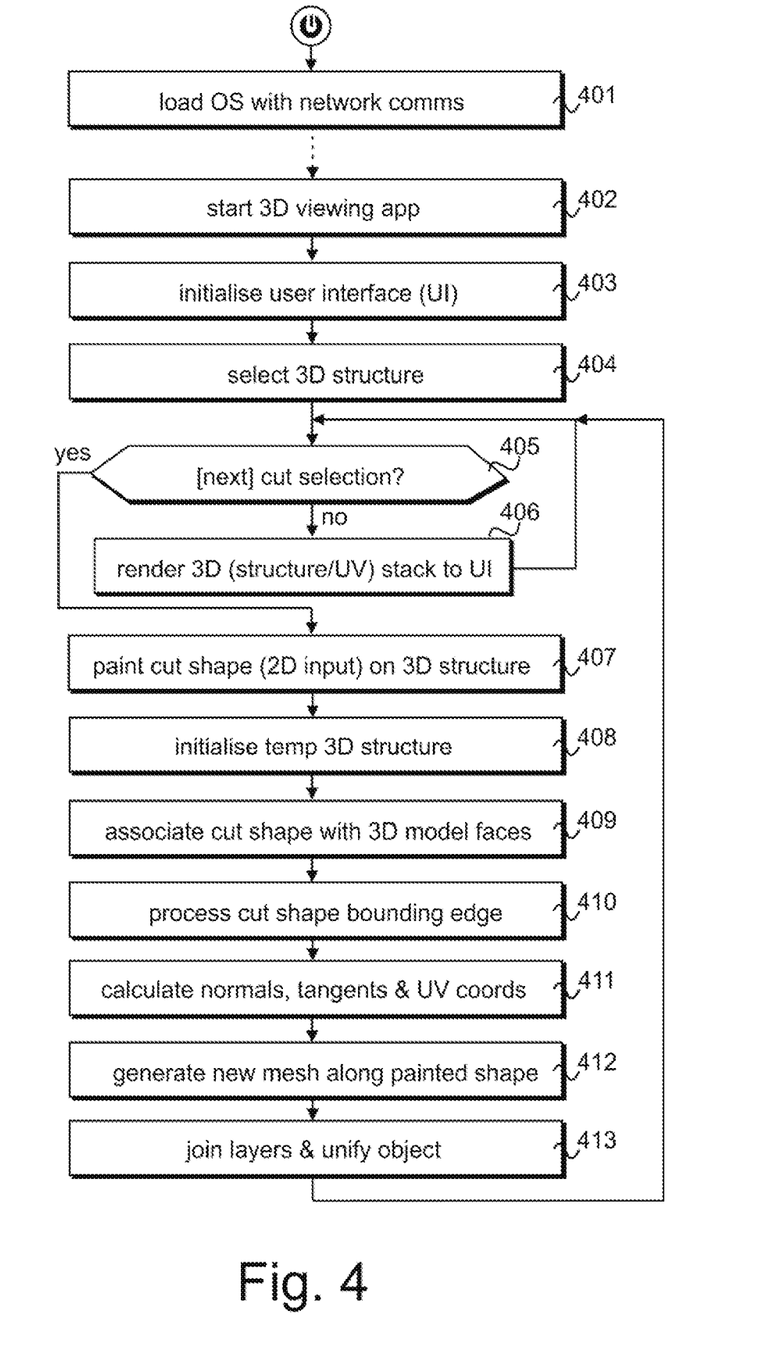
FIG. 4 details data processing steps performed by the terminal of FIGS. 1 to 3 for generating and controlling a tool adapted to cut freeform shapes in the UV mapped 3D dimensional structures of FIGS. 1 to 3 according to an embodiment of the present invention.
Figure 5:
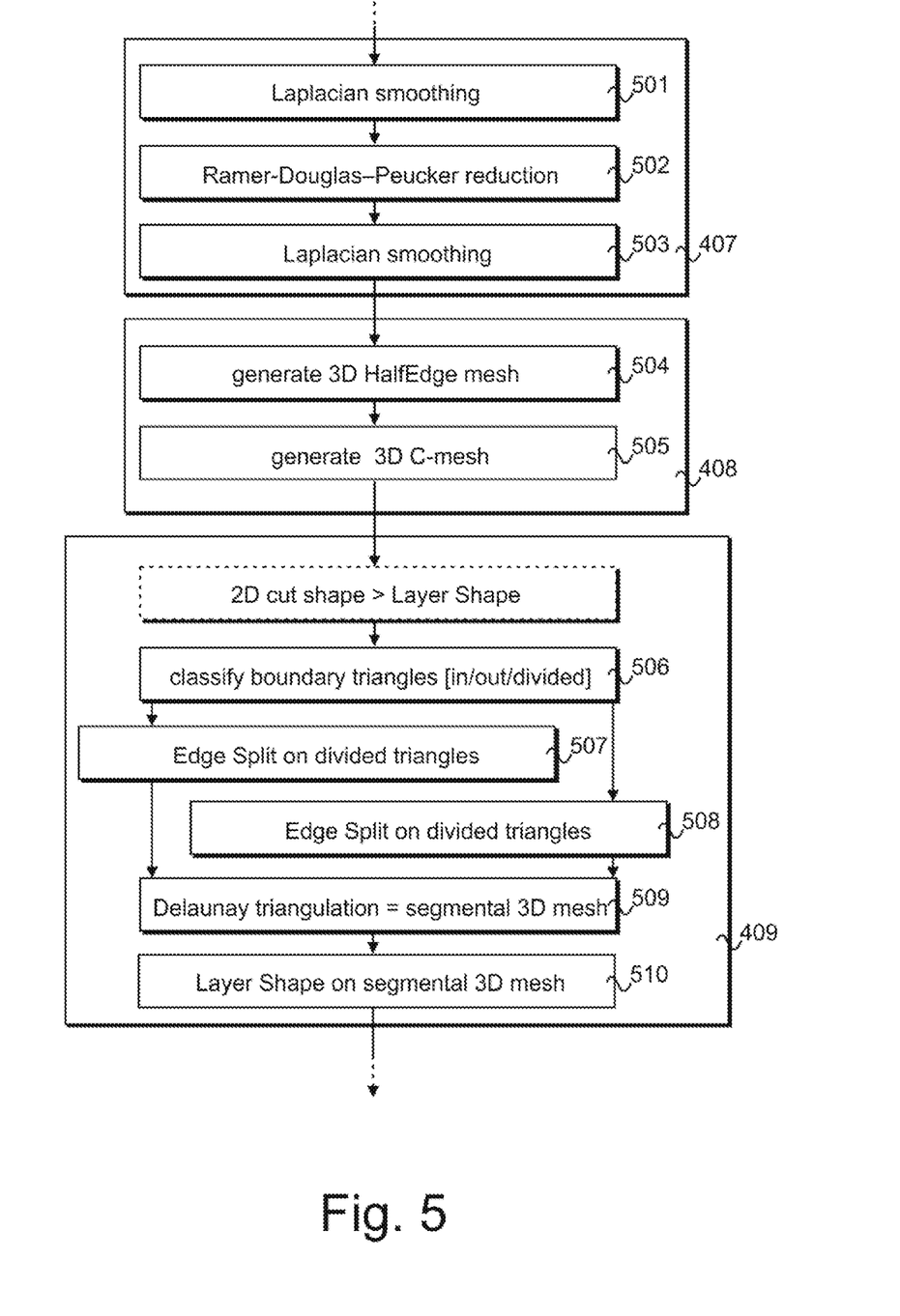
FIG. 5 further details data processing steps of FIG. 4 according to an embodiment of the invention.

An application is shown at 303, which configures the terminal 101, 102 to perform data processing steps described hereafter with reference to FIGS. 4 and 5, which embody a method of performing freeform cuts through a polygon mesh on a 3D model and the reapplication of surrounding mesh properties to new edges in real time. The application 303 is interfaced with the OS 301, particularly subroutines 302A of the OS reading and processing the two-dimensional user input to the touchscreen interface 209, and optionally also network communication subroutines 302B of the OS, via one or more suitable Application Programmer Interfaces.

An application user interface (UI) is shown at 304, which the application 303 outputs to the VDU 209 and in which the application 303 both renders 3D structures 305 and reads two-dimensional X, Y user input effecting selections therein on the touchscreen interface or digitizer via the relevant OS subroutine 302A. 3D structures 305 are created from at least one polygon mesh $306_N$, which is a collection of vertices, edges and faces and wherein faces usually consist of triangles (triangle mesh), quadrilaterals, or other simple convex polygons, and one or more UV texture maps $307_N$, which are two-dimensional images applied to faces of the 3D structures $306_N$ when rendering the structure 305. Structures 305 may also be layered, as consisting of nested 3D structures $306_N$ each having a same or respective UV texture map $307_N$, associated with its respective faces.

An embodiment of the present invention is shown as a cut tool 308 of the application 303, which is a subset of instructions for reading two-dimensional X, Y user input effecting one or more cut shape selections in the UI 304 on the touchscreen interface or digitizer via the relevant OS subroutine 302A, and for processing this user input and rendering an edited structure 305 incorporating the one or more user-defined cut shapes. Cut tool data is accordingly shown as temporary 3D meshes 309, a Layer Shape module 310 and the user input 311 corresponding to the cut shape selection, all processed according to data processing steps described hereafter with reference to FIGS. 4 and 5.

Further local data 313 and network data 314 may be stored in the memory means 202 of the data processing terminal 101, 102 at runtime, some or all of which may be processed either by the application 303 or by or for another application 312 being processed in parallel with application 303. An example of further local data is for instance local user input 311 read by the OS 301 in real time from the hardware interface 209, but which user input lies outside the user interface 304 of the application 303. An example of further network data is for instance remote application updating data 314 communicated by the remote server 103 over the WAN 104.

With reference to FIGS. 4 to 8 now, after powering up the apparatus 101, 102 and optionally accessing and downloading the 3D viewing application 303 from the remote server 103 across the network described in FIG. 1, the 3D viewing application 303 is started locally at step 402 and the user interface 304 instantiated on the VDU 209 as a result. A user of the apparatus 101, 102 may then perform a selection of a 3D structure 305 for rendering in the UI 304, for example a skull, a knee or a leg, whereby the application 303 eventually buffers the 3D structure 305 for rendering.

A question is then asked at step 405, as to whether the user has input user data invoking the cut tool subroutine 308. If the answer is negative, then the 3D viewing application 303 renders the buffered selected 3D structure 305 in the UI at step 406, and control returns to the question of step 405, or alternatively to another question (not shown) as to whether the user wishes to effect a new selection at step 404, or to still another question (not shown) as to whether the user wishes to alter the rendering perspective via one or more rotations, translations, scaling and the like of the current 3D structure 305 in the UI.

Figure 6:
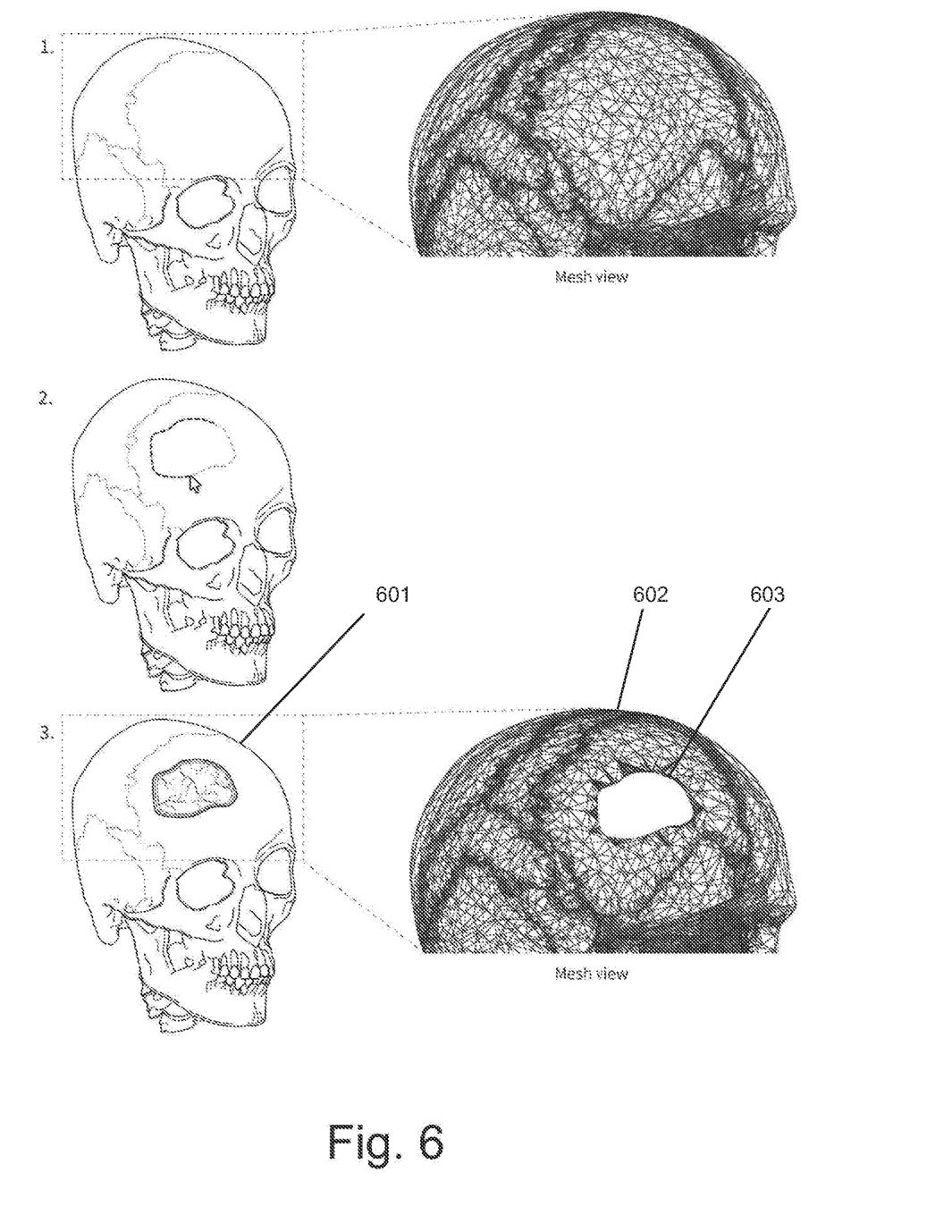
FIG. 6 illustrates three stages of a 3D skull structure processed according to the steps of FIGS. 4 and 5.

If the answer is positive, however, then the cut tool subroutine 308 begins at a first step 407 which consists of painting the shape 601 of the desired cut on the 3D model 305 in the user interface 304, namely reading the user selections via the touchscreen 209 on the 3D structure 305 in the UI. Painting on the model creates the shape of the cut with a number of points. Painting, combined with the conversion of 2D points to 3D space and a read from an offscreen depth buffer (i.e. Z-buffer) creates a predefined render. At this point, a painted curve exists with many points which is floating in 3D space very close to the 3D model 305.

Once established, the curve is modified with three algorithms to reduce amount of points, prevent future miscalculations and make it smooth. In this embodiment, these include a Laplacian smoothing algorithm 501 to smooth the draw path, a Ramer-Douglas-Peucker algorithm 502 to reduce the number of points and a final Laplacian smoothing algorithm 503 to remove duplicate points. Other known smoothing and point reduction algorithms can also be used to achieve this task.

The next step 408 is to prepare the selected 3D mesh to work with. A HalfEdge mesh is created at 504 to improve the speed of calculations and optimize searches. On top of the HalfEdge mesh, a C-Mesh is created at 505. This temporary structure will hold many of the changes which will be applied to the final polygon mesh, for example the deletion of unnecessary faces and the re-creation of mesh in the cut-out place 602 or the addition of new triangles data. 603.

The next step 409 is the association of points with faces on the 3D model. This begins by projecting approximate intersection points of the painted curve back onto screen in 2D and then mirroring back to find correct intersections on triangles. This operation provides specific points on the model. Based on the distance and number of intersection points identified on triangle faces, the number of layers associated with the 3D model and their order are known. This data is used to create a special tool which represents a 2D shape of the cut. The tool, which we call Layer Shape, is saved in a container for future use in the C-Mesh.

Now that the 3D mesh and location of the cut is known, the next step 410 is to determine what lies inside and outside of the freeform shape 601 and refine the edges for each layer of intersections along the painted curve. Firstly, an algorithm is run at 506 using Layer Shape which determines three elements (1, 2, 3) of each triangle which has intersection points, wherein 1 means outside, 2 means inside and 3 signifies a division relative to the freeform shape 601. Triangles outside are left to remain part of the mesh 306 as it is. Triangles inside the freeform shape 602 will be added to the main stack for deletion. Divided triangles have points both inside and outside, for example 2 points inside and 1 point outside, or 1 point inside and 2 points outside. These divided triangles will always have two edges which need to be split.

Continuing from this point requires more detail. To determine the point on the edge 601, an Edge Split algorithm is run at 507. This builds a plane from neighbouring intersection points of two triangles and then finds the intersection point for the plane and edge. This point is then added to a Triangle Container, which is created for each triangle affected by the painted curve 601, and stored with all other data for future triangulation work. Running simultaneously to the Edge Split algorithm, a check on neighbouring triangles is done at 508 to see if they are intersected by a segment from the painted curve 601, but not touched by any point of actual curve. Finally, a Delaunay triangulation algorithm, or any other triangulation algorithm, joins points from Triangle Container at 509. This creates a new mesh 603 for a segment where a single triangle had previously existed. The final result of the triangulation leaves a number of triangles remaining which need to be analyzed, as some could still remain inside of the shape. For this, Layer Shape is used at 510 to identify if centroid and approximate points of the triangle lie inside or outside the shape. If the triangle is determined as inside, that triangle is skipped.

The next step is the calculation of normals, tangent angles and texture coordinates for new points at 411. Once this data has been collected, it is added to the C-Mesh.

The next step is the processing of layers where a new mesh is generated along the painted curve at 412. After this is accomplished, all data which was added to main stack is deleted from the C-Mesh.

The next step 413 joins layers together to keep the object solid. To do this, all points of two neighbouring layers are joined with a simple triangulation. This triangulation sorts the points in the direction of the paint and calculates the optimal distance to join the closest points in each triangle. After all operations 409 to 413 have been completed on C-Mesh, all changes migrate to HalfEdge, the mesh rebuilds and this results in final Vertices and indices data supplied to the buffer and rendering step 406.

The method embodied by the steps described herein and the apparatus configured to perform same as described herein thus provide an intuitive user-controllable software tool to cut freeform shapes through polygon mesh and UV maps on a 3D model within a software program.

The apparatus 101, 102 can be used to interact with and manipulate the polygon mesh 306 and UV maps 307 of a 3D model 305 directly, which is invaluable in learning environments wherein visualization of subject-matter from multiple angles is a standard and proven tuition technique, for instance 3D learning plates in medical reference materials.

Accordingly, the techniques disclosed herein are particularly useful with medical reference software tasked to represent relationships between different anatomical structures and wherein there is a need to cut specific shapes through existing multi-layered structures, for instance specialized surgical techniques detailing complex cuts.

Figure 7:
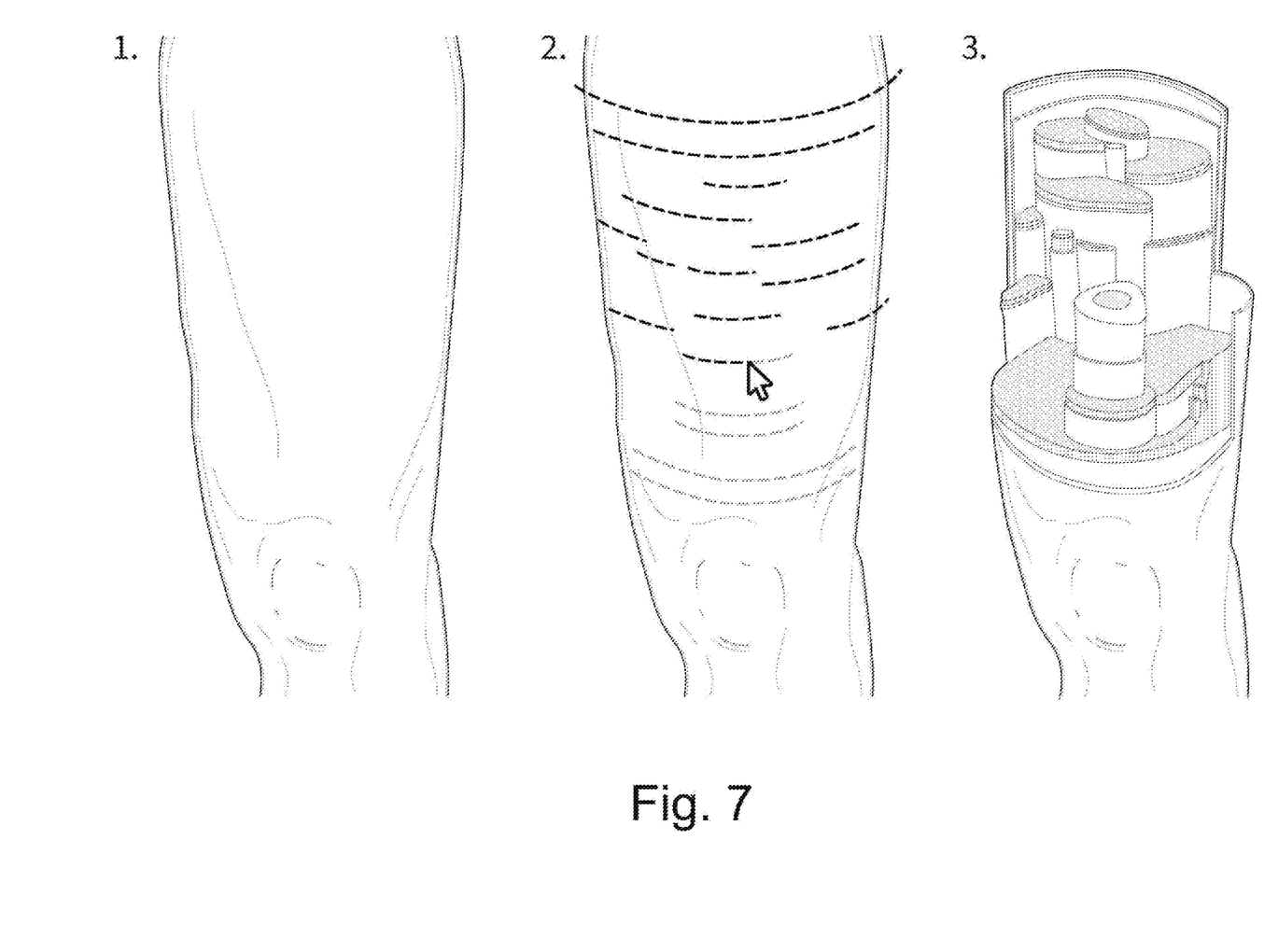
FIG. 7 illustrates three stages of a 3D knee structure processed according to the steps of FIGS. 4 and 5.
Figure 8:
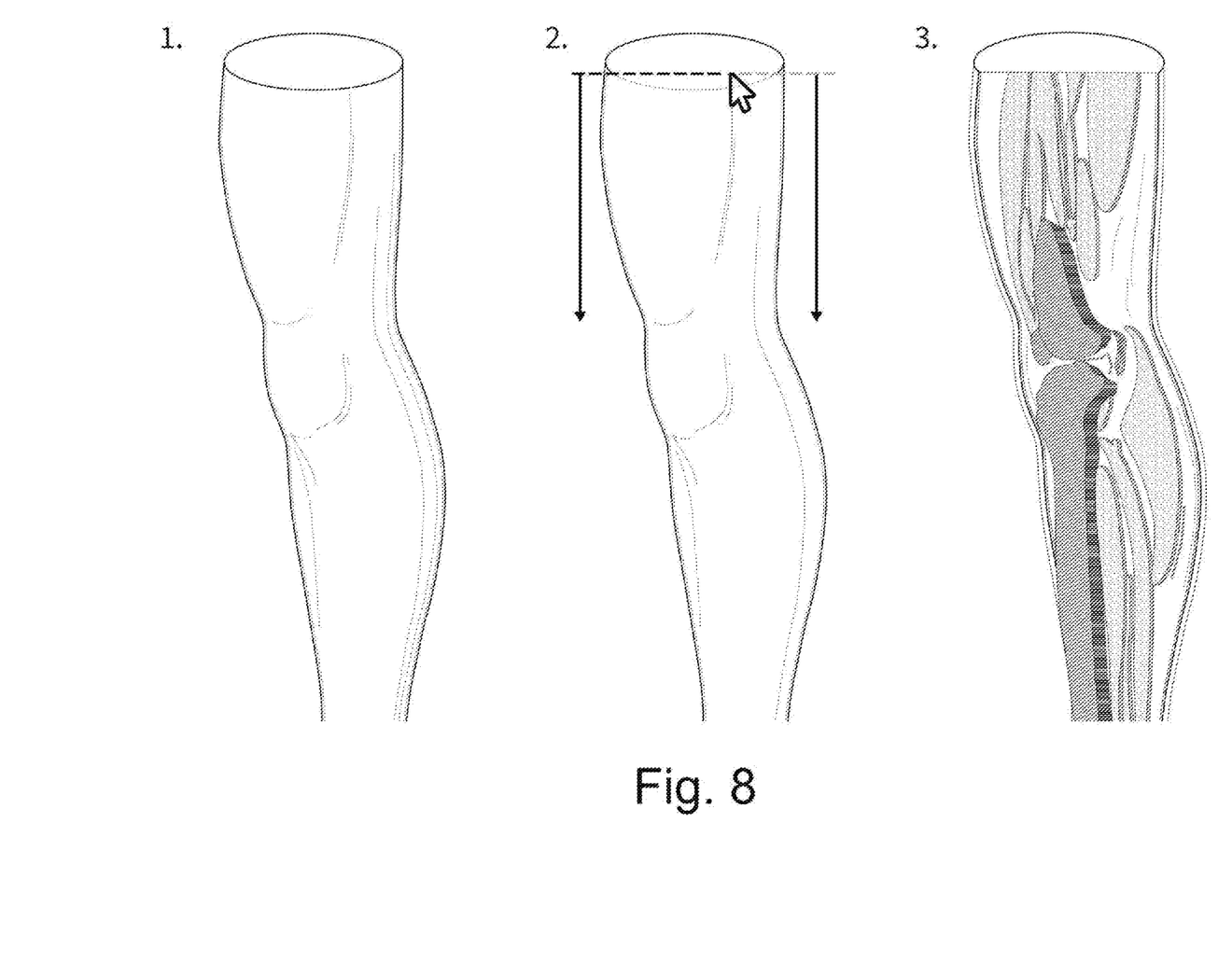
FIG. 8 illustrates three stages of a 3D leg structure processed according to the steps of FIGS. 4 and 5.

FIGS. 6, 7 and 8 each illustrate respective outputs over time of a medical viewing application 303 embodying the method according to the embodiment of FIGS. 4 and 5 for simulating freeform cuts through 3D anatomical structures, namely a skull a knee and a leg.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

The invention is not limited to the embodiments hereinbefore described but may be varied in both construction and detail. For example, it will be readily understood by skilled persons that the inventive principle disclosed herein may be permanently integrated into the base configuration of an item through relevant manufacturing techniques, for instance injection moulding, rather than manufacturing the attachment device separately from the item to be secured thereto.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention claimed is:

1. An apparatus for editing a digital three-dimensional structure associated
   with one or more two-dimensional textures in real time, comprising:
   a. a data storage adapted to store the digital three-dimensional structure and the one or more two-dimensional textures;
   b. a data processor adapted to process the stored digital three-dimensional structure and the one or more two-dimensional textures and output same in a user interface, read freeform user input in the user interface and process freeform user input data into a cut shape of the three-dimensional structure, generate a simplified structure based on the three-dimensional structure, associate points of the cut shape with the simplified structure to generate a curve, determine new points of the curve corresponding to edges of the curve on the simplified structure, calculate geometrical characteristics and texture coordinates of the new points, and generate a new three dimensional structure along the curve and join layers of the structure; and
   c. a display for displaying the user interface;
   wherein the data processor is further adapted to associate points by painting the cut shape on the three-dimensional structure as a plurality of points converted to three-dimensional space and read from an off-screen depth buffer, defining a curve.

2. An apparatus according to claim 1, wherein the data processor is further adapted to process the plurality of points with a Laplacian smoothing algorithm and a Ramer-Douglas-Peucker algorithm.

3. An apparatus according to claim 2, wherein the data processor is further adapted to determine new points by projecting approximate intersection points of the painted curve in two dimensions then mirroring back to find intersections on triangles.

4. An apparatus according to claim 3, wherein the data processor is further adapted to calculate by identifying a number of intersection points on triangle faces to determine a number and an order of layers associated with the simplified structure.

5. An apparatus according to claim 4, wherein the data processor is further adapted to calculate by determining points of each triangle intersecting another triangle to identify divided triangles having two splitable edges.

6. An apparatus according to claim 5, wherein the data processor is further adapted to split triangle edges by building a plane from adjacent intersection points of two triangles and determining an intersection point for the plane and edge.

7. An apparatus according to claim 6, wherein the data processor is further adapted to joining layers joining all points of two neighbouring layers via triangulation.

8. A method of editing a digital three-dimensional structure associated with one or more two-dimensional textures in real time, comprising the steps of:
   a. processing the digital three-dimensional structure and the one or more two-dimensional texture and outputting same in a user interface,
   b. reading freeform user input in the user interface and process freeform user input data into a cut shape of the three-dimensional structure,
   c. generating a simplified structure based on the three-dimensional structure,
   d. associating points of the cut shape with the simplified structure to generate a curve,
   e. determining new points of the curve corresponding to edges of the curve on the simplified structure,
   f. calculate geometrical characteristics and texture coordinates of the new points,
   g. generating a new three dimensional structure along the curve and joining layers of the structure, and
   h. updating the user interface;
   wherein associating points comprises the further step of painting the cut shape on the three-dimensional structure as a plurality of points converted to three-dimensional space and read from an off-screen depth buffer, defining a curve.

9. A method according to claim 8, wherein determining new points comprises the further step of processing the plurality of points with a Laplacian smoothing algorithm and a Ramer-Douglas-Peucker algorithm.

10. A method according to claim 9, w herein determining new points comprises the further step of projecting approximate intersection points of the painted curve in two dimensions then mirroring back to find intersections on triangles.

11. A method according to claim 10, wherein calculating comprises the further 5 step of identifying a number of intersection points on triangle faces distance to determine a number and an order of layers associated with the simplified structure.

12. A method according to claim 11, wherein calculating comprises the further step of determining points of each triangle intersecting another triangle to identify divided triangles having two splitable edges.

13. A method according to claim 12, wherein calculating comprises the further step of building a plane from adjacent intersection points of two triangles and determining an intersection point for the plane and edge.

14. A method according to claim 13, wherein joining layers comprises the further step of joining all points of two neighbouring layers via triangulation.

15. A method according to claim 13, wherein the stored digital three-dimensional structure and the one or more two-dimensional texture comprises learning plates in a medical reference.

\* \* \* \* \*